Inventors:
Wilhelm Ritzerfeld and
Gerhard Ritzerfeld
By Michael S. Striker
agt.

Inventors.
Wilhelm Ritzerfeld and
Gerhard Ritzerfeld
By Michael S. Striker
agt.

Inventors
Wilhelm Ritzerfeld and
Gerhard Ritzerfeld
By Michael S. Striker
att.

Sept. 20, 1960 W. RITZERFELD ET AL 2,953,087

APPARATUS FOR AUTOMATIC SELECTIVE REPRODUCTION OF PRINTING FORMS

Filed Dec. 17, 1956 8 Sheets-Sheet 4

Inventors:
Wilhelm Ritzerfeld and
Gerhard Ritzerfeld
By Michael S. Striker
agt

Inventors:
Wilhelm Ritzerfeld and
Gerhard Ritzerfeld
By Michael S. Striker
att.

Sept. 20, 1960 W. RITZERFELD ET AL 2,953,087

APPARATUS FOR AUTOMATIC SELECTIVE REPRODUCTION OF PRINTING FORMS

Filed Dec. 17, 1956 8 Sheets-Sheet 6

Inventors:
Wilhelm Ritzerfeld and
Gerhard Ritzerfeld
By Michael S. Striker
att.

Inventors:
Wilhelm Ritzerfeld and
Gerhard Ritzerfeld
By Michael S. Striker
agt.

Sept. 20, 1960 W. RITZERFELD ET AL 2,953,087

APPARATUS FOR AUTOMATIC SELECTIVE REPRODUCTION OF PRINTING FORMS

Filed Dec. 17, 1956 8 Sheets-Sheet 8

Inventors:
Wilhelm Ritzerfeld
and Gerhard Ritzerfeld
By Michael S. Striker
agt.

United States Patent Office 2,953,087

Patented Sept. 20, 1960

2,953,087

APPARATUS FOR AUTOMATIC SELECTIVE REPRODUCTION OF PRINTING FORMS

Wilhelm Ritzerfeld, Schorlemer Allee 14, Berlin-Dahlem, and Gerhard Ritzerfeld, Franzensbader Strasse 21, Berlin-Grunewald, Germany Filed Dec. 17, 1956, Ser. No. 628,933

Claims priority, application Germany Dec. 17, 1955

15 Claims. (Cl. 101—132.5)

The present invention refers to a duplicating method and apparatus and more particularly to a method and apparatus for the reproduction of single or selected lines or sections of printing forms and also for the reproduction of the whole content of a printing form.

It is an object of the present invention to provide a duplicating method in which selected printing sections of a printing form are reproduced by automatic selective control of the printing operation through pre-arranged control marks applied to a control sheet.

It is another object of the present invention to provide a method for automatic selective reproduction of printing sections of a printing form, in which the printing is done on moistened copy sheets and in which both the selective printing operation and the moistened operation are automatically and selectively controlled through pre-arranged control marks applied to a control sheet.

It is yet another object of the invention to provide a duplicating machine capable of automatically and selectively reproducing printing sections including single lines as well as the whole content of the printing form through sensing of control marks pre-arranged on a control sheet.

It is a further object of the invention to provide a duplicating machine capable of automatically reproducing from a printing form a pre-selected set of printing sections in consecutive order and also to produce selectively single sections out of the set of pre-selected printing sections through sensing corresponding control marks pre-arranged on a control sheet.

It is another object of this invention to provide a rotary duplicating machine in which printing forms and associated control sheets carrying control marks are used and in which the control marks of the control sheet are sensed during the operation of the machine and in which the printing operation is controlled by the sensing of control marks associated with those printing sections that are to be reproduced.

It is yet another object of the invention to provide a marking device for producing in a printing form or control sheet, control marks coordinated with printing sections or lines of the printing form and pre-arranged for controlling the printing operation by being sensed by sensing devices of a duplicating machine and in accordance with the duplicating method according to this invention.

With above objects in view, an embodiment of this invention is a duplicating method in which a printing form having a set of printing sections and a control sheet having a set of control sections respectively associated with the printing sections of the printing form and carrying control marks in the control sections thereof are moved at the same speed, and in which the control sections are sensed while the printing sections consecutively pass over a copy sheet, and in which those printing sections are printed on the copy sheet in whose associated control sections control marks are sensed.

Another embodiment of this invention is a method of the type set forth in which the copy sheet is pressed together with those printing sections in whose associated control sections control marks are sensed so that selected printing sections associated with the sensed control sections are printed.

Still another embodiment of this invention is a method as set forth in which a selected section of the copy sheet is moistened whenever a control mark is sensed and in which such moistened section of the copy sheet is pressed together with the printing section in whose associated control section a control mark is sensed.

A duplicating machine, according to this invention, comprises a rotary printing roller and a counter roller, one roller being movable towards the other by operating means for the purpose of reproducing printing sections on copy sheets fed to said rollers, a printing form including printing sections and being attached to the printing roller, and a control sheet attached to the printing roller and having control sections respectively associated with the printing sections and carrying control marks, further including sensing means for sensing the control marks on the control sheet, and means connecting the sensing means with the operating means for moving one of the rollers into printing position so that selected printing sections associated with control sections in which control marks are sensed, are printed on the copy sheets.

In one embodiment of this invention a duplicating machine of the type set forth includes electromagnetic means for actuating the operating means, and electric circuit means connecting the sensing means with the electromagnetic means and including additional control means for selectively actuating the operating means.

In a further embodiment of this invention, a duplicating machine of the type set forth includes a selector device for rendering selected sensing members operative so that not selected sensing members are inoperative when control marks are passed by such not selected sensing members, and so that a selected printing section can be selectively reproduced although control marks are sensed which are not associated with the operative printing section.

In another embodiment of this invention a duplicating machine of the type set forth includes control means for consecutively changing the selection of a printing section automatically between consecutive revolutions of the printing roller so that during consecutive revolutions of the printing roller different single printing sections are reproduced.

In still another embodiment of the invention a duplicating machine of the type set forth includes moistening means operable selectively by sensing means sensing the control marks, for the purpose of moistening such sections of the copy sheet on which selected printing sections are to be reproduced through the effect of sensed corresponding control marks associated with the operating means.

In a preferred embodiment of this invention, in the method and apparatus as set forth control sheets are used in which the control marks are perforations, while the printing roller has a conductive surface and the sensing means are brushes or other contacts capable of closing a circuit including the printing roller and electromagnetic means for actuating the operating means when a sensing contact engages the surface of the printing roller through a perforation of the control sheet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 10:
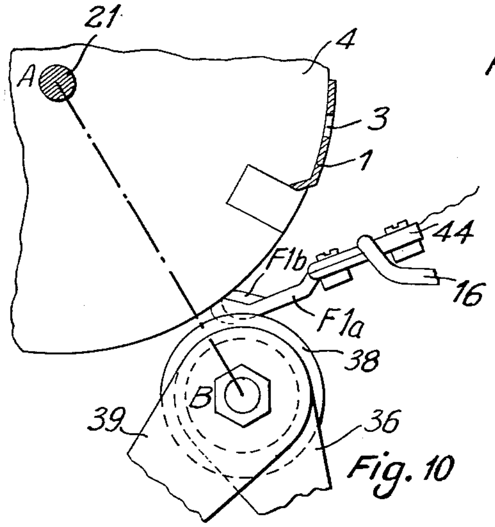
Figure 7:
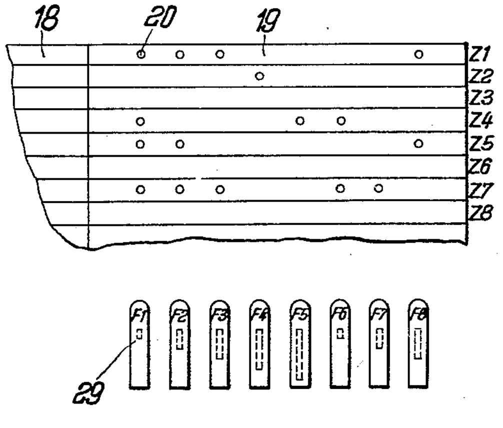
Fig. 7 illustrates another perforated portion of a printing form or of a special control sheet or strip provided with several perforations arranged alongside each other for the purpose of determining the size of the section to be reproduced and also illustrates diagrammatically the sensing means employed together with this type of form.
Figure 7A:
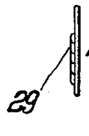
Figures 8, 8A:
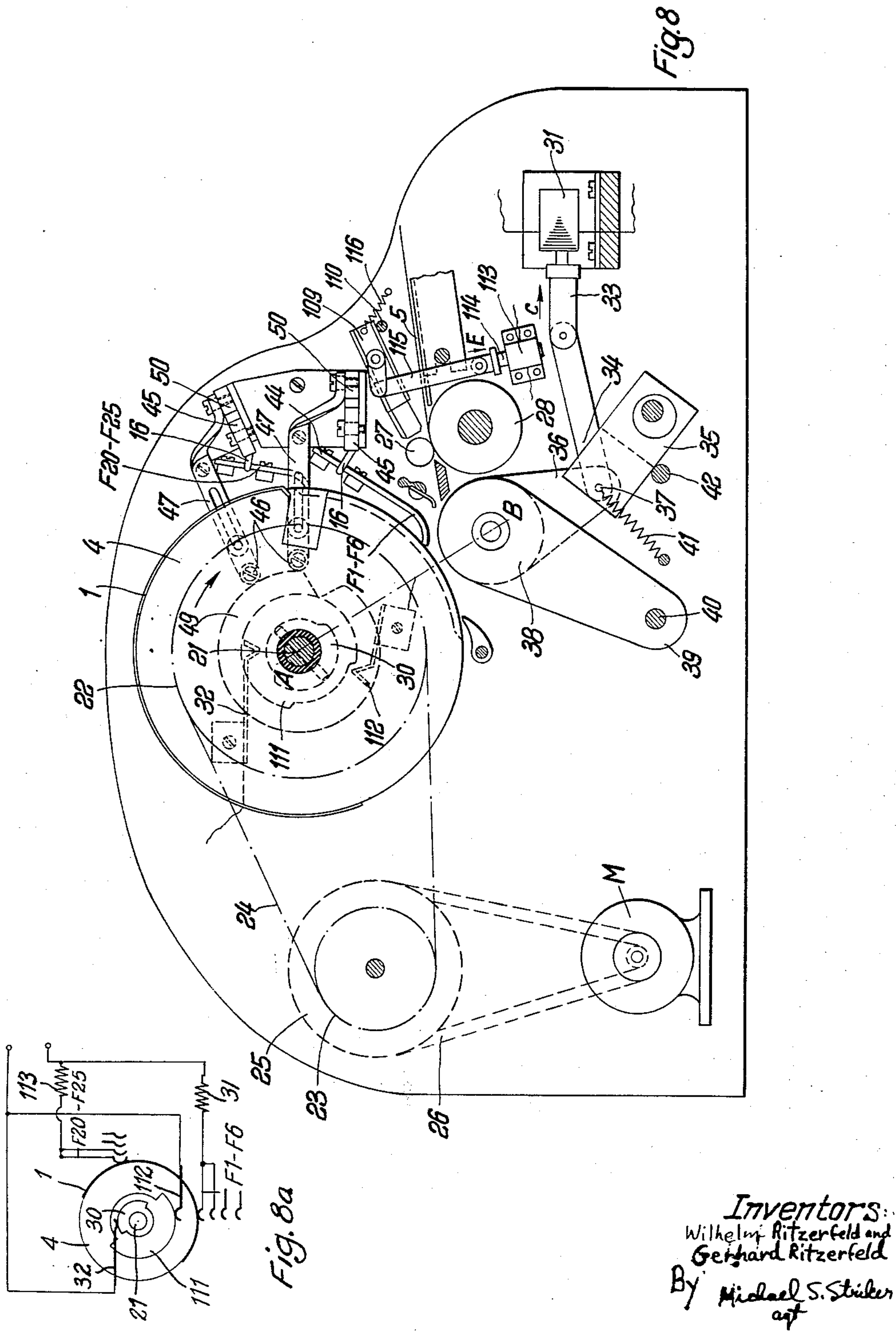
Figure 9:
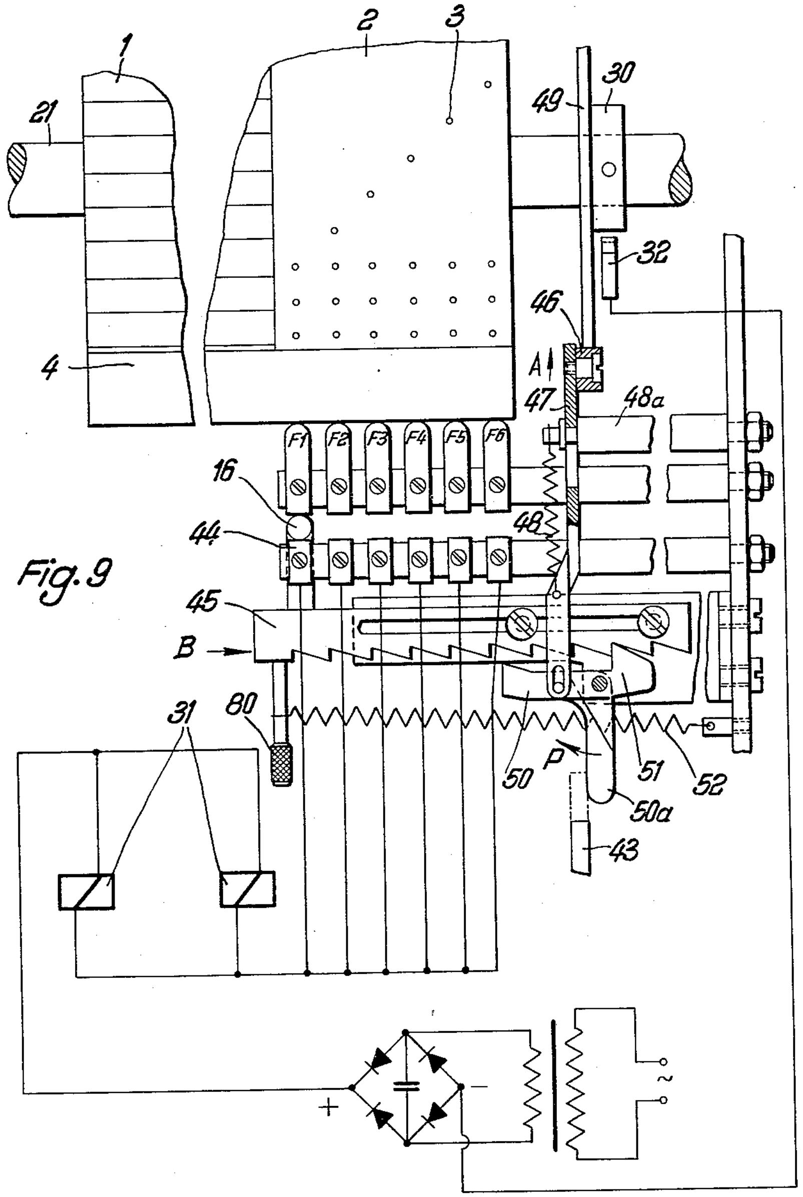
Figure 11:
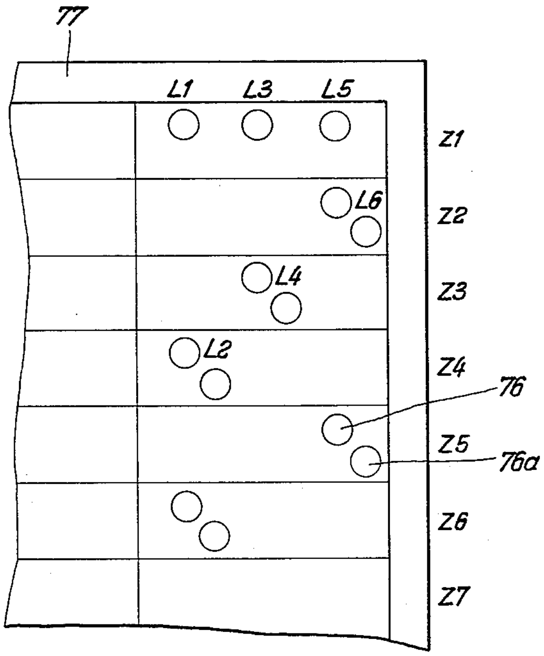
Figure 11:
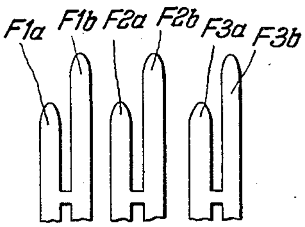
Figure 12:
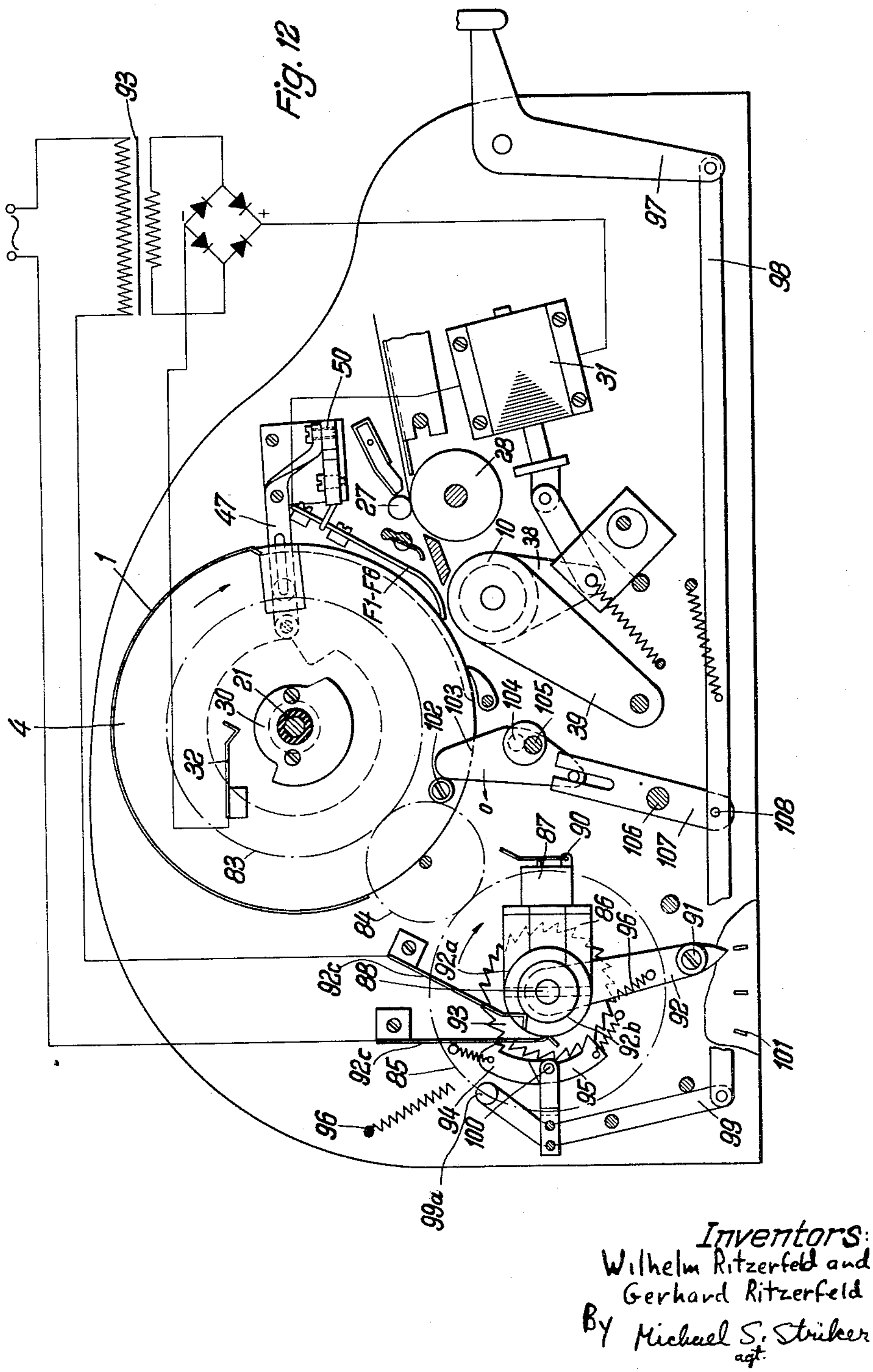
Figure 13:
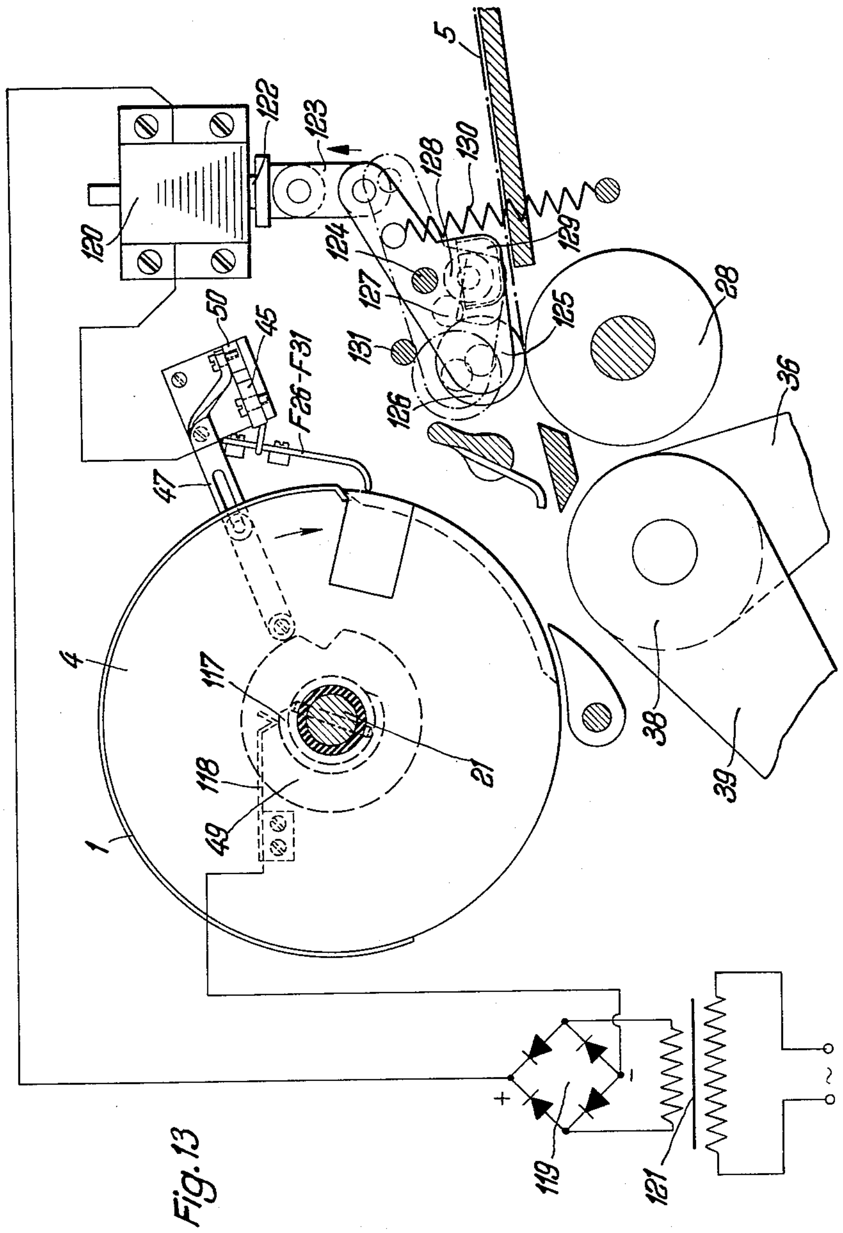

Fig. 7*a* is a diagrammatic lateral view of the sensing means shown in Fig. 7;

Fig. 8 is a lateral elevation of a rotary duplicating machine, the left wall of the frame being omitted for the sake of clarity, for illustrating the electromagnetic means for controlling the counter roll by means of electrical sensing and including an electromagnetically controlled moistening device;

Fig. 8*a* is a wiring diagram illustrating the electrical circuit used in the machine according to Fig. 8;

Fig. 9 illustrates diagrammatically certain elements for the control of the machine shown in Fig. 8 and contains a wiring diagram of this machine;

Fig. 10 is a partial diagrammatic elevation illustrating certain details of the mechanism of the machine shown by Fig. 8;

Fig. 11 illustrates a printing form or a special control sheet or strip provided with perforations which overlap each other as seen in the direction of the lines, for the purpose of extending the time during which the circuit is closed, illustrating also diagrammatically the corresponding sensing device;

Fig. 12 is a lateral elevation of another embodiment of a rotary duplicating machine according to the invention, the left side wall being omitted for the sake of clarity and in order to illustrate a device designed to close a circuit for the feeler mechanism so as to automatically select different lines; and Fig. 13 is a lateral elevation of another embodiment of a rotary duplicating machine according to the invention, the side walls of the machine being omitted for the sake of clarity and for showing an electromagnetically controlled moistening device provided with rollers.

Figures 1, 2:
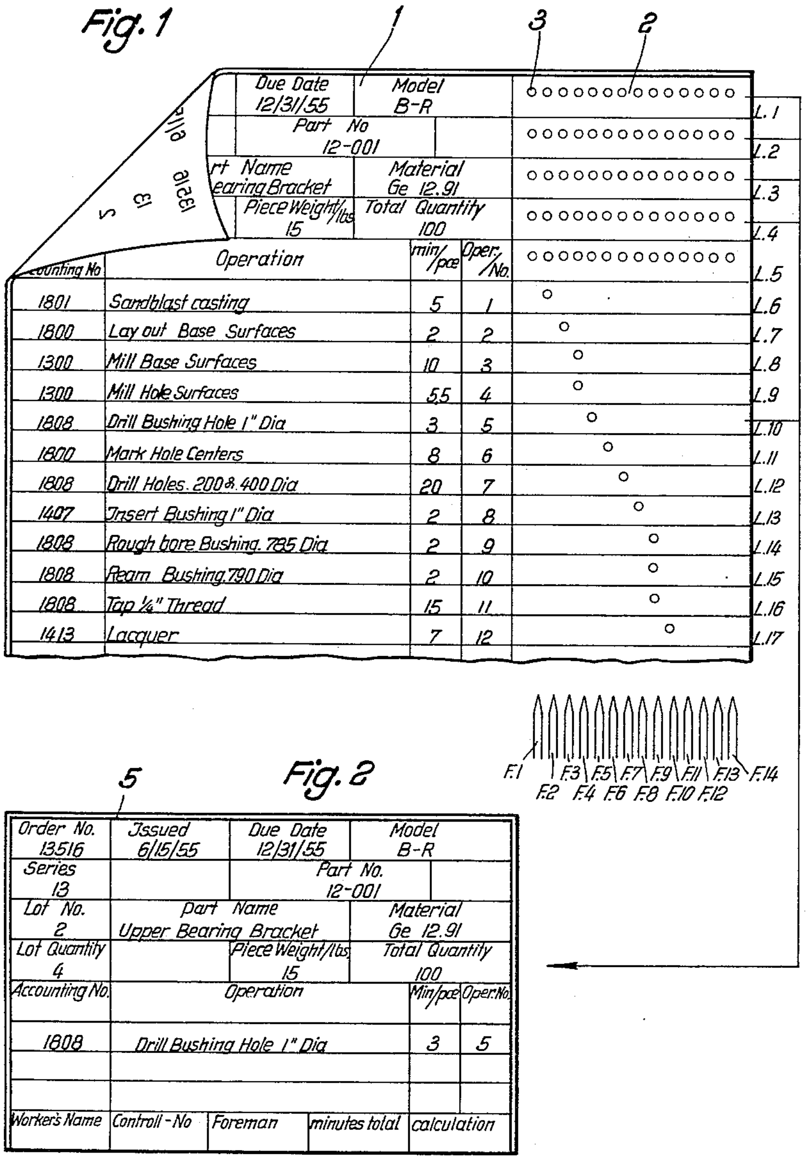
Fig. 1 illustrates a printing form designed for reproducing a production control form, perforations being provided for control of a rotary duplicating machine capable of printing selected sections of the printing form, the sensing device used for such control being illustrated diagrammatically in relation to the perforations of the form.
Fig. 2 illustrates a job card reproduced from the printing form shown by Fig. 1.

Referring now to Fig. 1, a printing form 1 is provided with a number of lines or sections identified by L.1, L.2, L.3, etc. to L.17. In the right hand portion of the printing form 1 there is a wide column without any printing extending from top to bottom that is from the first to the last line or section of the form. This empty column 2 is perforated by electrical or mechanical perforating means or by means of a typewriter controlled punch as described below, the individual holes 3 being arranged in a predetermined manner. Other types of control marks 3 may be provided. When the printing form 1 is attached to the printing roller 4 of a rotary duplicating machine described further below, the holes 3 serve for controlling the selective and automatic reproduction of the various entries or lines of the form, for instance, individual operations or items on a card for production control. The holes 3 are arranged on the form 1 both in horizontal lines constituting control sections and in vertical columns. Associated with each vertical column of holes is a sensing device or feeler contact F1, F2, F3, etc. up to F14. In operation, through cooperation of the first contact F1 with the first vertical row of holes 3 only the head section of the form 1, that is the lines L.1 to L.5, would be reproduced on the item card 5 illustrated in Fig. 2. However, by a change of the setting of the machine which will be described later on, a second feeler contact F2 becomes operative with respect to the second vertical row of holes; thereby perforations 3 in the lines L.1 up to L.6 are selected by the sensing device and the corresponding lines are printed during operation of the machine.

If, for instance, the feeler contact F4 cooperates with the fourth vertical column of the holes in the printing form 1 then the holes 3 in the lines L.1 to L.5, L.8 and L.9 are sensed and the corresponding lines are printed. The operation is therefore an intermittent printing operation controlled by the sensing action so that the head portion comprising lines L.1 to L.5 and the lines L.8 and L.9 are printed with omission of the intermediate lines L.6 and L.7. Due to the fact that the perforations 3 for the lines L.8 and L.9 are arranged in vertical alignment, the printing operation produces two consecutive lines.

Fig. 2 illustrates another example comprising the reproduction of the head portion, lines L.1 to L.5 and also of the line L.10, which is the result of the cooperation of the fifth feeler contact F5 and the fifth vertical row of holes 3 in the printing form 1.

Figures 3, 4:
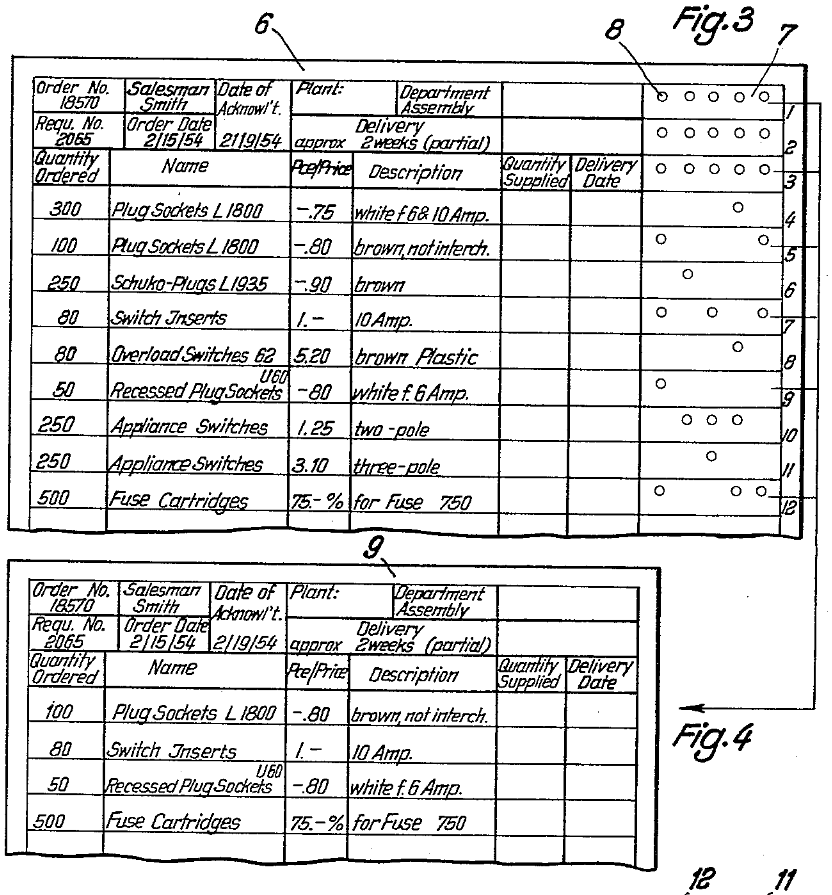
Fig. 3 illustrates a printing form for handling orders and accounts, perforations being provided for the control of a rotary duplicating machine for selectively printing individual lines or printing sections from this form.
Fig. 4 illustrates an order sheet printed from the form shown in Fig. 3.

Fig. 3 shows an example in which selective printing is used in connection with the processing of orders and with billing operations. The operation is generally the same as that described in connection with Fig. 1. In this case, the articles or supplies required and usually not listed in the chronological sequence of required deliveries, are printed selectively by means of a perforation 8 in column 7 of the printing form 6 and are reproduced on a card or sheet 9 as shown by Fig. 4.

Fig. 4, accordingly, illustrates the reproduction obtained from the printing form 6 shown by Fig. 3 by means of the first feeler contact F1 and of the first vertical row of perforations 8 in the printing form 6.

Figure 5:
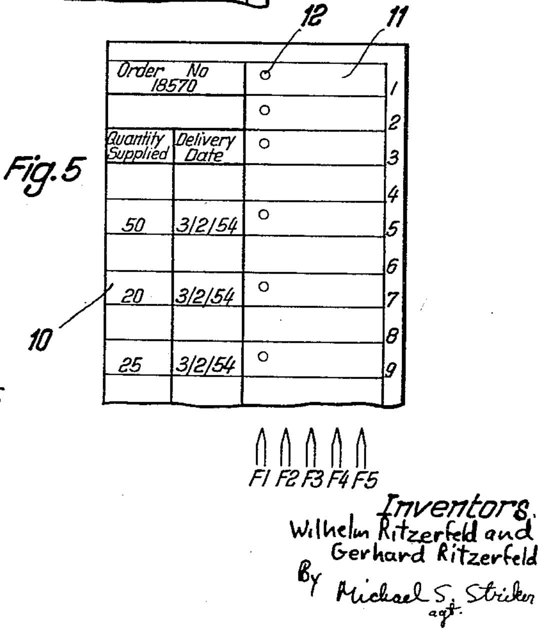
Fig. 5 illustrates a supplementary printing form for combination with the form shown by Fig. 3 and shows also diagrammatically the sensing means used for controlling the machine by means of the perforations in the printing form.

As is illustrated by Fig. 5 a supplementary printing form or a supplementary control sheet or strip 10 with a column 11 with perforations 12 can be used in connection with form 6 for the purpose of handling partial deliveries. This supplementary printing form 10 is to be placed over the printing form 6 on the printing roller 4 after the column 7 with the perforations 8 of the printing form has been bent back or cut off. Now the headings "Quantity supplied" and "Delivery Date" are reproduced together with the corresponding entries and together with the remaining original contents of the printing form 6. The reproduction of the selected lines from both forms is then controlled by the perforations 12 of the supplementary printing form 10.

It should be noted that in this method any holes or control marks that for any reasons have to be eliminated or should not be used can be very easily cancelled by pasting paper or insulating material across the particular control mark.

While the markings on the printing forms associated with the individual lines or sections thereof have been described as punched holes, it should be understood that equivalent markings can be used in the same manner and for the same purpose, as for instance markings in contrasting colors or black and white combined with photoelectric sensing means, or magnetic markings produced with graphite or the like combined with inductive sensing means.

It can be seen from the above description, that the markings for the control of the printing elements of the duplicating machine can be arranged directly on an integral part of the printing form as well as on a separate sheet or strip in such an arrangement that the markings or perforations are associated with the individual lines or sections of the printing form.

The markings can be arranged on the printing form or separate control sheets or strips transversely aligned with the individual lines or sections of the form, however, they can also be arranged in a vertically offset position with respect to the lines or sections of the forms, as long as the offset is uniform.

Preferably the markings or perforations are arranged in certain areas of the printing form which is free of other matter intended to be reproduced. However, the markings or perforations can also be arranged between the individual lines of printed matter on the form and can be distributed over the whole area of the printed form.

In case a separate control sheet or strip is used it can be attached to, or joined with, the actual printing form, for instance, by pasting after it has been provided with the markings or perforations, in such a manner that the markings or perforations are in proper relative position with respect to the lines or sections of the printing form.

It is also immaterial, which type of material is used for the printing forms or separate control sheets or strips. Preferably, however, paper is used for this purpose.

Figure 6:
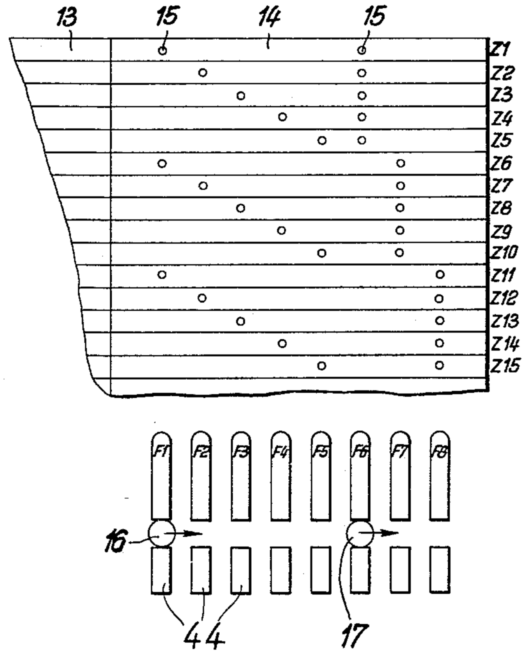
Fig. 6 illustrates the perforated portion of a printing form or of a control sheet or strip provided with a certain combination of perforations and illustrates also diagrammatically sensing means in relation to the control strip or printing form.

As is illustrated by Fig. 6, the perforations can be arranged in a different manner, for instance, by locating two separate holes 15 in one and the same line Z1 in the area 14 of a printing form 13.

In this case again a set of feeler contacts F1, F2, etc. is arranged for cooperation with associated vertical rows of perforations. Each feeler contact F1, etc. is associated, but not connected with, a terminal 44. Connection between the individual feeler contact F1, etc. and the associated terminal 44 is obtained by a sliding contact member 16 and 17, respectively, which are provided for movement through and along the gap between the individual feeler contacts F1, etc. and the associated terminals 44. The individual feeler contacts F1 etc. are connected in the circuit only when the sliding contact 16 or 17, respectively, connects the particular feeler contact with the associated terminal 44 as will be explained later.

With this arrangement it is possible to operate the device in such a manner that for instance the contact member 17 is in the position shown in which the feeler contact F6 is operative and that during one revolution of the printing drum the contact F1 is operative through the corresponding position of the contact member 16. However, during the next revolution of the printing drum the contact member 16 is positioned between the feeler contact F2 and its terminal 44 so that now the feeler contact F2 is operative. In this manner, the contact member 16 is moved stepwise with every revolution of the printing drum from one feeler contact F1 etc. to the next following one while the contact member 17 remains in the position previously held. In the example illustrated in Fig. 6, the sequence of operations will continue until the sliding contact member 16 reaches its position between the feeler contact F5 and its terminal 44. After this the contact member 17 is moved one step forward into the position contacting the feeler contact F7 and now the operation of the contact member 16 is started again from the feeler contact F1 in the same manner as before. This means that at all times one feeler contact is in operative condition through the contact member 17 and at the same time changing feeler contacts F1 to F5 are consecutively placed into operative condition by the stepwise movement of the sliding contact member 16. The circuit of the device is arranged in such a manner that those two feeler contacts F1 etc. which are rendered operative by the selected position of the sliding members 16 and 17, respectively, are connected in series so that operation of the printing device is effected only when two selected feeler contacts are at the same time in contact with the printing roller 4 through corresponding perforations 15 in the printing form or special control sheet 13. The manner of operation described can easily be understood from inspection of the hole pattern on the printing form 13 as illustrated by Fig. 6.

Figs. 7 and 7*a* illustrate another type of perforated control sheet or strip and the corresponding feeler contacts F1 to F8. These feeler contacts F1 to F8 are provided with projecting contact portions 29 of different lengths. By the use of this kind of feeler contacts it is possible to print several consecutive lines while using only one contact, for example F5. Due to the engagement of that particular feeler contact portion 29 with one of the perforations 20 of the form 18, depending upon the length of the projecting contact area 29 on the particular feeler contact F1 etc. several printing sections are reproduced. Thereby it is possible to establish contact by holes arranged in one line for operating the printing roller through several printing sections, or lines, of the printing form.

Referring now to Fig. 8, a printing roller 4 with a printing form 1 attached thereto, is carried by a shaft 21 which obtains its drive through chain sprockets 22 and 23 and a chain 24, moreover, by a pulley 25 and belt 26 from a motor M. If the roller 4 is made entirely of metal it must be insulated against the shaft 21. The copy sheet 5 is fed by rollers 27 and 28 into the printing area marked by the line A—D. The conductive outer surface of the printing roller 4 is connected with a camlike contact ring 30 rotating with roller 4, with a sliding contact 32 bearing upon ring 30. As can be seen from Fig. 8, a conductive connection between the conductive surface of the roller 4 and the contact 32 is only established after the roller 4 has started its revolution, when the contact 32 is in engagement with the raised portion of the contact ring 30. The arrangement is such that the contact 32 engages the ring 30 only when the forward edge of the print form 1 has reached the feeler contacts, for instance F1 to F6, which bear against the printing roller 4. However, as is illustrated in Fig. 8*a*, the circuit for the operation of the solenoid 31 is operatively closed only when one of the feeler contacts F1 to F6 makes contact with the conductive surface of the printing roller 4 by dropping through a perforation 3 of the printing form 1 (see Fig. 9).

Whenever the solenoid 31 is energized, the armature 33 is moved in direction of arrows C. This armature 33 is connected by a link 34 to the toggle levers 35 and 36 which are connected by a pivot pin 37. The movement of the armature 33 changes the relative position of the toggle levers 35, 36 with the effect that the counter roller 38 is moved by its carrier brackets 39 on a circular path around their pivots 40 and is pressed against the printing roller 4 or rather against the copy sheet 5 and the form 1 attached thereto. Under the pressure exerted by the counter roller 38 the printing operation is carried out. After a perforation 3 of the printing form 1 has passed the corresponding feeler contact F1 etc. the particular feeler contact is again separated from the conductive surface of the printing roller 4 by the printing form 1 which is made of insulating material so that thereby the current through the solenoid 31 is interrupted. Now the return spring 41 moves the toggle lever arrangement 35, 36, 37, the link 34 and armature 33 into their respective starting positions which are defined by the stop pin 32.

Shortly before the feeler contacts F1 to F6 leave the printing form 1 the engagement between the contact ring 30 and the sliding contact 32 is terminated so that the feeler contacts F1 to F6 may remain in engagement with the conductive surface of the printing roller 4 without closing a circuit regardless of the fact that the insulating material of the printing form 1 is no longer interposed between the feeler contacts and the printing roller. Since, as was stated above, each vertical row of perforations of the printing form or control sheet is associated with one particular feeler contact, it is necessary to render these feeler contacts alternatively operative so that during each revolution of the printing roller 4, as shown in the example illustrated by Figs. 8 and 9, only one of the vertical rows of perforations 3 is sensed by the feeler contact. For this purpose, each of the feeler contacts F1 to F6 is associated with a supplementary element which is a terminal 44. A gap is provided between the rear end of each feeler contact F1 etc. and the associated terminal 44. In order to render a feeler contact, for instance F1, operative a sliding contact member 16 is inserted between the rear end of the feeler contact F1 and the associated terminal 44 by the movement of a rack bar 45 to which the contact member 16 is attached with interposition of insulating material so that in this manner a conductive connection between the feeler contact F1 and the terminal 44 and thereby a connection from the particular feeler contact F1 to the solenoids 31 is established. Shortly before the completion of a revolution of the printing roller 4 the sliding contact member 16 is automatically shifted to the next following feeler contact, for instance F2, so that during each following revolution of the printing roller 4 another vertical row of perforations of the printing form 1 or control sheet or strip is sensed by the next following feeler contact.

Attached to the shaft 21 for rotation therewith is a cam disc 49 having a notch. A cam follower roller 46 is carried by a sliding link 47 which is under the control of a spring 48. Therefore, every time the cam follower roller 46 meets the notch of the cam disc 49 the sliding link 47 is pulled by the spring 48 in the direction of arrow A towards the guide post 48*a*. Through this movement of the sliding link 47 a step controlling pawl 51 is pulled into a notch of the rack 45 while at the same time the locking pawl 51 is moved out of engagement with another notch of the rack 45. Therefore, the rack 45 is pulled by a spring 52 in the direction of arrow D so that a next following notch of the rack 45 abuts against the pawl 51, and when through the action of the cam disc 49 and the link 47 the control pawl 50 is moved back again in direction opposite to arrow A, the locking pawl 50 is again engaged by a notch of the rack 45 and held in the position in which the sliding contact 16 is in engagement with the next following contact feeler F2 and the associated terminal 44. Consequently, in the next revolution of the printing roller 4 the next following vertical row of perforations 3 in the printing form or control sheet is sensed.

The automatic shifting means 45, 50, 51 for the sliding contact member 16 can be made inoperative by moving a locking bar 43 from its inoperative position shown in full lines in Fig. 9 into a position shown in dotted lines, in which it engages a control lever 50A attached to the pawl arrangement 50—51. Whenever the pawls 50, 51 are moved the lever 50A would make a movement in the direction of arrow P. However, by the engagement with the lock 43 in its operative position this movement is prevented. Therefore the link 47 is ineffective on the pawls 50, 51. The result of locking the pawl device, as described, by the locker means 43, is that during a number of revolutions of the printing roller 4 the sliding contact member 16 remains in a selected position and therefore only that vertical row of perforations 3 is sensed during these revolutions of the printing roller 4 which is associated with that feeler contact F1 etc. with which the contact member 16 is in contact in that selected position.

While the just described shifting device serves to shift the contact member 16 automatically between revolutions of the printing roller 4, means are provided also for manually shifting the contact member 16 into a selected position. For this purpose the above mentioned lever 50A can be manually operated so as to rock the pawls 50, 51 in the same manner as they are otherwise operated by the cam controlled sliding link 47 and with the same effect. For instance, by moving the handle 50A three times in direction P the sliding contact member 16 would be moved three steps along the set of feeler contacts F1 etc. A handle 80 attached to the rack bar 45 serves to move the rack bar and with it the contact member 16 at any time from a selected position back into the starting position shown in Fig. 9 or into any other position to the left of the previous position.

While the selector means and shifting device associated with contact members 16 have been described with reference to Fig. 9, it should be understood that for the operation of the other sliding contact member 17 shown in Fig. 6, a device of similar structure and operation is provided although not shown in the drawings. If automatic shifting of such a device for control of the contact member 17 is desired, for instance, a cam member driven by the shaft 21 but at a lower speed would have to be employed so that, to refer to the examples shown in Fig. 6, the contact member 17 would be shifted one step only after every five revolutions of the printing roller 4.

Referring again to Figs. 8 and 8*a*, a selective control of the moistening device is provided in the embodiment of the invention according to Fig. 8. The control of the moistening device 109 is effected by electromagnetic means. The moistening device 109 for the copy sheet 5 is ordinarily held in inoperative position by a spring 116 which pulls the device against a stationary stop 110. In this manner the copy sheet 5 can be fed into starting position against the rollers 27, 28 without being moistened. On the insulated shaft 21 of the printing roller 4 which has a conductive surface and is insulated against the shaft 21, a second contact ring 111 is mounted for rotation therewith, and a second sliding contact 112 cooperates with the contact ring 111. During the rotation of the printing roller 4 with the printing form 1 attached thereto the sliding contact 112 engages the raised portion of the contact ring 111 and thereby closes part of the operating circuit, when the feeler contacts F20 to F25 reach the forward edge of the printing form. The feeler contacts F20 to F25 are otherwise arranged and mounted in the apparatus and with respect to the printing roller 4 in the same manner as the above described feeler contacts F1 to F6. When anyone of the feeler contacts F20 to F25 engages one of the perforations 3 of the printing form 1 or a corresponding control sheet a circuit for the solenoids 113 is closed through the contact between the tip of the corresponding feeler contact F20 etc. and the conductive surface of the printing roller 4. When energized, the solenoids 113 move their armatures 114 in direction of arrows E and pull through a link 115 the moistening device 109 towards the copy sheet 5 and thereby cause selected sections of the copy sheet 5 corresponding to one or several lines to be moistened in accordance to selected perforations of the printing form or control sheet.

After one perforation 3 of the printing form 1 or a corresponding control sheet has been engaged by a feeler contact F20 etc. the insulating effect of the printing form 1 or control sheet interrupts the circuit and therefore the solenoids 113 are deenergized and become inoperative. The spring 116 moves the moistening device 109 and also the link 115 and the armature 114 back into their starting positions so that the moistening effect on the copy sheet 5 is momentarily interrupted. The set of feeler contact F20 etc. is selectively controlled by a second set of shifting means and a similar set of sliding contact members 16, 17 as was described above in accordance with Fig. 9 in respect to the set of feeler contacts F1 etc.

Fig. 13 illustrates only the electromagnetic control of a roller type moistening device in greater detail. In the starting position of the printing roller 4 the contact ring 117 is in engagement with the stationary sliding contact 118 and therefore connects the conductive surface of the printing roller 4 to the minus side of a selenium rectifier 119. Since in this position of the roller 4 the feeler contacts F26 to F31 are resting against the conductive surface of the printing roller 4 the whole circuit is closed and therefore the solenoids 120 are connected also to the plus side of the rectifier 119 and are energized by the power furnished from the transformer 121. The armatures 122 of the solenoids 120 are connected to links 123 and these links in turn are connected to levers 125 turnable on pivots 124. Mounted on the levers 125 is a roller type moistening device comprising a moistening roller 126, an intermediate roller 127, a pick-up roller 128 and a moisture tank 129.

The moistening roller 126 acts at the same time as a feed roller in cooperation with the counter roller 28. Whenever the solenoids 120 are energized the moistening roller 126 of the moistening device is pressed against the counter roller 28 against the action of the springs 130. In this manner the copy sheet 5 can be first fed with its forward edge against the rollers 126, 28 being in contact with each other. As the printing roller 4 revolves with the printing form 1 attached thereto, the contact feelers F26 to F31 engage the printing form 1 and through the insulating effect of the printing form 1 the circuit of the solenoids 120 is interrupted. The moistening roller 126 of the moistening device is then lifted by the springs 130 from the copy sheet 5 until this movement is stopped by the stop pin 131. When however a feeler contact F26 etc. engages a perforation of the printing form 1 or corresponding control sheet attached to the surface of the printing roller 4, one of the feeler contacts, for instance F26, closes the corresponding circuit and thereby the moistening roller 126 is again pressed by the above described electromagnetic control against the copy sheet 5.

In this manner, selected sections of the copy sheet 5 are moistened selectively under the control of the set of feeler contacts F26 etc. in accordance with the perforations arranged on the printing form 1 or a corresponding control sheet. Consequently, in a duplicating method where the copy sheet has to be moistened for the purpose of picking up the image of the printing form 1, only those selected sections of the printing form 1 will be reproduced on the copy sheet for which a corresponding section of the copy sheet has been selectively moistened as described above.

It should be understood, that in the arrangements illustrated by Figs. 8 and 13, the position of the cooperating elements is such that the circumferential distance from the point of contact of the feeler contacts F20 etc. with the printing form to the line or area of printing marked A—B in Fig. 8 is substantially equal to the distance from the moistening device to the printing area marked by the line A—B provided the circumferential speed of the roller 4 is equal to the linear feeding speed of sheet 5. On the other hand, for similar reasons the position of the feeler contact F1 etc. with respect to the printing area marked by the line A—B should be as close as possible to this printing area provided that the perforations in the printing form or control sheet are positioned on the form or control sheet in line with the printed matter to be reproduced from the particular printing section. If, however, the perforations are offset in vertical direction that is in the direction of movement of the form on the printing roller 4 then the positions of all the feeler contacts would have to be offset correspondingly against the above described relative position thereof.

In carrying out the combined selective control of both the printing elements and of the moistening device as illustrated by Fig. 8, it should be understood that two methods may be used, in one of which one group of perforations on the printing form or corresponding control sheet are used for cooperation with both sets of feeler contacts F1 etc. and F20 etc., while in the other method two separate groups of perforations are used, one for cooperation with the set of feeler contacts F1 etc., the other group for cooperation with the set F20 etc.

Referring now to Fig. 12, an embodiment of a duplicating apparatus according to this invention is illustrated in which shiftable means are provided for the control of the operation in such a manner that no matter how many perforations are arranged on the printing form or control sheet in one vertical row, in each revolution of the printing drum only one line or section corresponding to one of the perforations in that vertical row is printed. The apparatus can be preset for selection of one particular line or section and then as many copies as desired may be produced by the machine with this one selected line only. In another mode of operation of the apparatus according to this embodiment the control can be carried out automatically in such a manner that in consecutive revolutions of the printing roller selected single lines or sections of the printing form are printed, the individual sections or lines changing from revolution to revolution. For this purpose, a shiftable control device is provided in this embodiment so that one selected feeler contact sensing a vertical row of perforations causes, upon engagement with one selected perforation of the printing form printing of a section of the printing form selected by the setting of the shiftable control device. This is done in the following manner. The arrangement of the perforations in the printing form or control sheet 18 is as shown by Fig. 7. The feeler contacts used in connection with this arrangement are, however, not the same as those shown in Fig. 7 and Fig. 7*a* because the feeler contacts F1 to F6 are not provided with operative contact areas 29 of different lengths.

The duplicatior apparatus according to this embodiment also comprises a printing roller 4 and a cooperating counter roller 38 as well as feeding rollers 27 and 28 for the copy sheet 5, as was described in reference to Fig. 8.

A rotary support 86 carrying the normally open switch 87 is mounted for rotation on a control shaft 88 which is driven by the printing roller 4 through a gear train 83, 84, 85. Since the gears 83 and 85 have the same diameter the rotation of the shaft 88 and of the supporting member 86 is always synchronous with the rotation of the printing roller 4. During rotation the actuator arm 90 of the switch 87 engages the roller 91 carried by a control arm 92. In this manner, the switch 87 is temporarily moved into closed position during the period during which the arm 90 passes the roller 91 in engagement therewith. When the control arm 92 is in its normal position, the closing of the switch 87 will occur simultaneously with the engagement of the corresponding feeler contact F1 etc. with the conductive surface of the printing roller 4 at the moment when the tip of the particular feeler contact F1 etc. encounters a perforation in the printing form 1 or corresponding control sheet. The closing of the switch 87 results in closing the primary circuit of the transformer 93 because the switch 87 is connected with two contact rings 92*a* and 92*b* on the hub of the rotary support 86, and because two contacts 92*c* and 92*d* respectively rest on these contact rings and are otherwise connected to the primary coil of the transformer 93. Simultaneously the electrical impulse in the primary coil of the transformer 93 is transmitted through a rectifier to the solenoid 31 because the secondary circuit is at the same time closed through the particular feeler contact F1 etc. and through the printing roller 4, the contact ring 30 and the sliding contact 32. Upon energization of the solenoid 31 the counter roller 38 is pressed towards the printing roller 4 and the printing of the selected section of the printing form 1 is effected.

The control arm 92 is turnably mounted on the shaft 88 so that it can be turned into a plurality of selected positions by turning the ratchet wheel 93 which is attached to the arm 92. The ratchet wheel 93 is controlled in its positions by a locking pawl 94 and a step controlling pawl 95 together with the action of a spring 96 attached at one end to the arm 92 and with its other end to the frame of the apparatus. When the two pawls 94 and 95 are operated so as to turn around their stationary pivot 100 the ratchet wheel 93 is caused by the spring 96 to make one angular step according to the size of one tooth thereof, in clockwise direction as seen in the drawing. By the angular movement of the ratchet wheel 93 the arm 92 with the roller 91 is moved through the same angle which corresponds to the spacing between two consecutive lines or sections of the printing form 1. The position of the arm 92 can be read from the outside by reference to markings 101, corresponding to the printing sections, of a dial, shown partly in Fig. 17, so that at any time the operator can see which is the actual position of the control arm 92 with respect to its normal position.

The term "normal position" in the above description of this embodiment has been used for the sake of convenience and may be interpreted to mean that position of the arm 92 which is associated with the first line Z1 of the printing form or control sheet 19. This means, that when the arm 92 is in this normal position and if a perforation is provided in the line Z1 of the printing form, then during one revolution of the printing roller 4 only line Z1 will be reproduced because if the feeler contact F1 would engage, at a certain moment of the revolution of the roller 4, the perforation in the first vertical row of the control sheet 19 and in line Z4, Z5 or Z7 thereof, this would be without any effect because at the time when the feeler contact F1 engages the last mentioned three perforations the switch 87 is simultaneously open. If, however, the control arm 92 is shifted into the fourth position corresponding to line Z4 then in turn the line Z1 would not be reproduced during that revolution neither would line Z5 or Z7 be reproduced, because in this case only when the feeler contact F1 engages the perforation in line Z4 the switch 87 is closed simultaneously.

The shifting of the control arm 92 into different positions and the operation, for this purpose, of the pawls 94, 95 can be done in different ways. If manual control is desired, operation of the shifting control lever 97 through link 98 and link 99 results in action by the end **99*a* of the lever 99 on the pawls 94, 95 so that with every depression of the lever 97 the control arm 92 moves one angular step in clockwise direction. In this manner the arm 92 can be set into any selected position corresponding to a selected line or section of the printing form and the setting of the arm 92 can be read, as stated above, on the dial markings 101**.

With this manual setting of the control arm a reproduction of one selected line or section of the printing form can be repeated as often as desired.

If, however, a consecutive change from revolution to revolution is desired so that in every consecutive revolution a different line or section of the printing form is to be reproduced, automatic shifting of the arm 92 can be obtained by the following means shown in Fig. 12. A roller 102 is mounted on the printing roller 4 for rotation therewith. From the outside, turnable around a pivot 104, a control lever 103 projects with its tip into the circular path of the roller 102. The two-arm lever 103 is in operative engagement with a second lever 107 turnable around a stationary pivot 106 and joined at its opposite end at 108 with the link 98. Therefore, when during the rotation of the printing roller 4 the roller 102 engages the tip of the lever 103 projecting into its circular path, the lever 103 is turned in the direction of arrow O so that the lever 107 swings in clockwise direction and operates the link 98 in exactly the same manner as it is operated otherwise manually from the lever 97. This means that with every revolution of the printing drum, and more specifically shortly before the completion of such revolution, the pawls 94, 95 are operated and in this manner the control arm 92 is shifted through one angular step in clockwise direction. If the automatic shifting control just described is not desired, then by turning an eccentric mounting 105 of the pivot 104 will cause the tip of the lever 103 to move into an inoperative position in which it does not project into the circular path of the roller 102. Finally, if the apparatus is to be operated in the regular manner without selection of single lines out of those lines on the printing form which are associated with perforations in a vertical row of perforations of control sheet 19, the two lines of the circuit of the primary coil of the transformer 93 ending at **92*c* and 92*d* are connected with each other, or in other words, the two contacts 92*c*, 92*d* are shunted so that the primary input into the transformer 93** is continuous and the feeler contacts F1 etc. will operate the apparatus in the normal manner described previously.

In Fig. 10 the printing area near the line A—B is illustrated on a larger scale in order to show specifically an alternative form and arrangement of the feeler contacts. As can be seen from Fig. 10 the individual feeler contact, for instance F1, is split up into two adjacent contact portions F1*a* and F1*b* which are offset against each other in the lengthwise direction thereof. This design and arrangement has the purpose of extending the time during which a particular feeler contact is in engagement with the conductive surface of the printing form 1 through one of the perforations 3. In this manner it is possible to keep the solenoids energized during a longer period of time independently of the actual size of the perforation in the printing form.

It should be understood that in all the embodiments described above not only selective reproduction of selected lines or sections can be carried out, but that also the reproduction of the full content of the printing form that is of all its lines or sections can be carried out in various ways. For instance, it is evidently possible to provide in the printing form or control sheet a series of consecutive perforations for every individual line, secondly, it is possible to lock the counter roller 38 mechanically in its printing position, or the solenoids operating the counter roll can be energized continuously by means of a separate switch in its circuit.

Fig. 11 illustrates in its upper portion a different arrangement of perforations L1 to L6 on a printing form 77, and in its lower portion the corresponding sensing device comprising feeler contacts F1*a* to F3*b*. In this case, in each of the control sections Z2 to Z7 pairs of perforations **76, 76*a* are provided in such a manner that the lower edge of one perforation 76 is in horizontal alignment with the upper edge of the other offset perforation 76*a* of the same pair or, if desired, the lower edge of hole 76 may be slightly lower than the upper edge of hole 76*a***. The corresponding contact feelers F1*a* to F3*b* have pairs of contact portions of different length. Due to the different lengths of the two prongs or portions of each feeler contact, and due to the offset position of the two holes **76, 76*a*** forming one pair, the shorter prong F3*a* engages, during sensing operation, first the perforation 76, and only afterwards the offset perforation **76*a*** is engaged by the tip of the longer prong F3*b*. Therefore, after the solenoid has been energized first by the engagement of the shorter prong F3*a*, the energization of the solenoid is extended through the overlapping contact periods of the two prongs and two holes and maintained as long as the longer prong F3*b* engages the other perforation **76*a***. In this manner it is possible to control by the perforations in any one of the control sections Z2 to Z6, with every engagement of one of the two-pronged feeler contacts, a reproduction of a comparatively larger printing section which in itself may comprise in the area of for instance section Z2 several lines of copy. This is done without repeated interruption of the contact engagement between the printing of every individual line of the copy, in other words, for instance, two consecutive lines can be printed without the counter roller being moved in and out of printing position between the printing of the two lines.

For the sake of completeness it may be mentioned that, of course, the perforations in the printing forms or control sheets or strips may be produced in various ways mechanically and even in a primitive manner manually for instance by means of a single perforating punch or perforating pliers so as to produce one perforation after the other individually.

If other types of control marks are to be used in connection with the present invention, then other devices are to be employed. For instance, if magnetic marks are used then the marking is done by means of graphite pins or the like, and if black and white or colored markings are used then corresponding devices of the typewriter type are employed, for instance, by the use of colored ribbons.

In practical use, the present invention covers a wide field of applications.

The invention is not restricted to the use of any particular type of printing forms or printing processes. Raised printing forms, flat printing forms as well as recessed printing forms and stencils may be used. For instance, in the class of raised printing forms it is possible to use printing forms wherein the characters or other symbols are raised by pressure, or aluminum foils of the screen type may be used, and in the class of flat printing forms, mirror-inverted forms of the wet process duplicating system or lithographic foils may be used. Preferably, the present invention applies to the use of mirror-inverted printing forms which are produced by typing or writing a printing form on a sheet of paper with a pigment carrying foil placed behind it.

It is also immaterial for the process according to the invention which type of duplicating or printing machine is used. Rotary duplicating machines for the reproduction of mirror-inverted printing forms are preferred. Nevertheless, other duplicating machines as for instance off-set printing machines or lithographic printing machines or stencil duplicators may be used. Instead of rotary duplicating machines also printing or duplicating machines of the flat bed type may be used.

Within the scope of the present invention various systems of marking may be used. For instance, the printing forms or separate control sheets or strips may be provided with a plurality of vertical columns or rows of control marks arranged next to each other of which each row is designed to control a different printing operation. Also the impulses for the control of the printing device of the duplicating machine may be produced by the associated or coordinated action of several coded control marks arranged next to each other in different relative positions. In this case the control of the printing device is carried out by means of sensing devices which are preset or coordinated in accordance to the particular system of control marks used on the printing form or control sheet. In case the printing sections include several lines, several control marks arranged next to each other may be used in association therewith, so that each mark cooperates with a sensing member of different effective length which means that the sensing device stays in contact for an extended period. Control marks of the last mentioned type may also be arranged next to each other but in a manner or relative position that they overlap each other as seen in the lengthwise direction of the particular control section, whereby several sensing members act at the same time on a particular control mark. In this manner it is possible to reproduce several successive lines without interruption of the actual printing operation.

Various types of sensing devices can be used. For instance, electrical sensing means may be used for sensing magnetic control marks. However, the sensing as well as the operation of the counter roller may quite as well be effected by purely mechanical or electromechanical means. In the case of use of black and white or colored control marks the sensing of the marks may be done by means of photo-sensitive cells which transmit the impulses through electronic devices like tubes or transistors to the solenoids controlling the printing device. In the case of use of colored control marks the impulses may be produced through a photo-sensitive cell, and for instance simultaneously through several transistors of which each reacts only to one particular color.

The method according to the present invention is of greatest value for processing orders and for billing procedures. For instance, when a new order has been received one printing form is typed out. Those items of the order which can be delivered immediately are correspondingly marked by perforations on the printing forms or a separate control sheet. The form then goes into the duplicating machine. The operator of the duplicating machine is completely relieved of the necessity of passing judgment and can carry out his work without the risk of any mistakes. The operator of the duplicating machine has nothing to do but to attach the printing form on the printing roller and has only to set the machine for reproduction of whatever refers to the first partial shipment. This being done, the duplicating machine will automatically print by means of the control marks or perforations applied to the printing form or control sheet, the shipping papers and the billing papers for the first paratial shipment referring to the particular order. The same procedure is repeated every time when more items of the order are available for shipment. In that case only further control marks corersponding to the now available items are made on the control sheet or printing form and then the machine will automatically produce the invoices and shipping papers for the second partial shipment in accordance with the printing form originally prepared for handling the entire order.

In a similar manner the process according to the invention is of great value in the field of production control in industry, because the operator of the duplicating machine has not to watch whether operations described in a single line of an operation sheet or operations comprising several lines are to be reproduced. Any resetting of the machine from one operation to the next one is eliminated. The duplicating machine automatically reproduces successively the selected operations and in particular reproduces the selected section of the printing form in the required size, which means a great reduction of the time for reproducing or printing and a fool-proof procedure in reproducing the job and operation sheets for the plant.

Another field for practical application of the process according to the invention is the tabulation of items of any kind, for instance, of bills, of material, selected by particular types of material, or excerpts from lists of customers, or of job schedules in accordance with accounting procedures etc.

Since by application of the invention the selective reproduction of lines or sections of a form is completely mechanized the operators of the duplicating machine do not have to get instructions regarding a particular selection of lines. Therefore, the operation of a duplicating machine can be placed in the hands of less skilled employees and the entire process of selective reproduction is rendered more efficient and economical.

It will be understood that each of the elements described above, or two or more together, may also find a useful application in other types of duplicating method and apparatus differing from the types described above.

While the invention has been illustrated and described as embodied in a method and appartus for automatic, selective reproduction of printing forms, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a duplicating machine, in combination, a rotary printing roller and a counter roller cooperating with said printing roller, one of said rollers being movable to and from a printing position in close proximity with the other roller; operating means for moving said one roller to and from said printing position; feeding means for feeding copy sheets to said rollers; sheet means detachably mounted on the peripheral face of said printing roller and including a set of printing sections, and a set of control sections respectively associated and correlated with said printing sections and carrying control marks in preselected control sections thereof; sensing means for sensing control marks on said sheet means; and connecting means connecting said sensing means with said operating means for actuating said operating means to move said one roller to said printing position when said sensing means sense a control mark whereby selected printing sections associated with said preselected control sections in which control marks are sensed are printed on the copy sheets.

2. In a duplicating machine, in combination, a rotary printing roller and a counter roller cooperating with said printing roller, one of said rollers being movable to and from a printing position in close proximity with the other roller; operating means for moving said one roller to and from said printing position and including an electromagnetic means; feeding means for feeding copy sheets to said rollers; sheet means detachably mounted on the peripheral face of said printing roller and including a set of printing sections, and a set of control sections respectively associated and correlated with said printing sections and carrying control marks in preselected control sections thereof; sensing means for sensing control marks on said sheet means; and circuit means connecting said sensing means with said electromagnetic means and including means for opening and closing the circuit and controlled by said sensing means to actuate said operating means to move said one roller to said printing position when said sensing means sense a control mark whereby selected printing sections associated with said preselected control sections in which control marks are sensed are printed on the copy sheets.

3. In a duplicating machine, in combination, a rotary printing roller and a counter roller cooperating with said printing roller, one of said rollers being movable to and from a printing position in close proximity with the other roller; operating means for moving said one roller to and from said printing position; feeding means for feeding copy sheets to said rollers; sheet means detachably mounted on the peripheral face of said printing roller and including a set of printing sections, and a set of control sections respectively associated and correlated with said printing sections and carrying control marks in preselected control sections thereof, the control marks in the respective control sections being spaced from each other in a direction transverse to the direction of movement of said sheet means with said printing roller during rotation of said printing roller; sensing means including a set of transversely spaced sensing members for respectively cooperating with said transversely spaced control marks in different control sections; selector means for selectively rendering each of said sensing members operative; and means connecting each of said sensing members with said operating means to actuate said operating means to move said one roller to said printing position when an operative sensing member senses a control mark whereby selected printing sections associated with said preselected control sections in which control marks are sensed are printed on the copy sheets.

4. In a duplicating machine, in combination, a rotary printing roller and a counter roller cooperating with said printing roller, one of said rollers being movable to and from a printing position in close proximity with the other roller; operating means for moving said one roller to and from said printing position and including an electromagnetic means; feeding means for feeding copy sheets to said rollers; sheet means detachably mounted on the peripheral face of said printing roller and including a set of printing sections, and a set of control sections respectively associated and correlated with said printing sections and carrying control marks in preselected control sections thereof, the control marks in the respective control sections being spaced from each other in a direction transverse to the direction of movement of said sheet means with said printing roller during rotation of said printing roller; sensing means including a set of transversely spaced sensing members for respectively cooperating with said transversely spaced control marks in different control sections; circuit means connecting said sensing means with said electromagnetic means; and selector means for connecting selected sensing members into said circuit means and for disconnecting the other sensing members whereby said electromagnetic means are actuated to move said one roller to said printing position whenever a connected sensing member senses a control mark whereby selected printing sections associated with said preselected control sections in which control marks are sensed, are printed on the copy sheets.

5. A duplicating arrangement as set forth in claim 4 wherein said control marks are perforations in said sheet means; and wherein said printing roller has a conductive surface supporting said sheet means and being connected into said circuit means; and wherein connected sensing members close said circuit means when engaging said conductive surface through said perforations.

6. A duplicating arrangement as set forth in claim 4, wherein said sensing members include sensing elements and terminals, each sensing element being associated with one of said terminals and spaced therefrom, and a shiftable connecting member shiftable in the space between said sensing elements and said terminals between selected positions for connecting in each position one selected sensing element with its associated terminal, and wherein said circuit means connect said electromagnetic means with said terminals whereby only that selected sensing element is operative with respect to said electromagnetic means which is connected by said connecting member with its associated terminal.

7. A duplicating arrangement as set forth in claim 4, wherein said sensing members include sensing elements and terminals, each sensing element being associated with one of said terminals and spaced therefrom, and two independently shiftable connecting members shiftable in the space between said sensing elements and said terminals in two selected positions for connecting in each position one selected sensing element with its associated terminal, and wherein said circuit means connect said electromagnetic means with said terminals, and wherein said printing roller is connected into said circuit means in series with two selected sensing members respectively connected by said two connecting members to their associated terminals, whereby said two selected sensing members close said circuit when said two selected sensing members sense two selected control marks so that said electromagnetic means are actuated to move said one roller to said printing position for printing a selected printing section associated with said selected two control marks.

8. A duplicating arrangement as set forth in claim 4, wherein said selector means are operable manually.

9. A duplicating arrangement as set forth in claim 1, wherein said sensing means include at least one sensing member having a sensing portion extending in the direction of rotation of said sheet means over at least two control sections for extending the sensing period for a particular control mark, whereby at least two consecutive printing sections starting with a section associated with said particular control mark are printed while said one roller is maintained in said printing position by said operating means.

10. A duplicating arrangement as set forth in claim 1, including sensing means comprising a plurality of sensing members respectively having sensing portions extending in the direction of rotation of said sheet means over a different number of control sections for extending the sensing period for a particular control mark whereby several consecutive printing sections starting with a section associated with said particular control mark are printed while said one roller is maintained in said printing position by said operating means, and including selector means for selectively rendering each of said sensing members operative.

11. A duplicating arrangement as set forth in claim 1, wherein said sensing means include a set of sensing members having separate adjacent operative portions overlapping each other in the direction of rotation of said sheet means for sensing a particular control mark in overlapping sensing periods whereby said operating means hold said one roller in printing position while being actuated by said portions of a sensing member.

12. A duplicating arrangement as set forth in claim 1, wherein said sensing means include sensing members having separate sensing portions offset against each other in the direction of rotation of said sheet means, and spaced from each other transversely, for sensing in overlapping sensing periods control marks which are associated with consecutive printing sections and spaced from each other transversely and in direction of the rotation of said sheet means at the same intervals as said sensing portions are offset and spaced with respect to each other, whereby several consecutive printing sections respectively associated with consecutive control marks are printed while said one roller is maintained in said printing position by said operating means.

13. A duplicating arrangement as set forth in claim 6, wherein said connecting means include shiftable means shiftable between a plurality of control positions respectively associated with selected printing sections and controlling in each of said control positions said operating means to move said one roller to said printing position when one selected printing section is located between said rollers while said sensing means sense the control mark associated with said one selected printing section; and shifting means for selectively shifting said shiftable means between said control positions whereby during each revolution of said printing roller only said associated control mark is operative to effect printing of a selected printing section.

14. A duplicating arrangement as set forth in claim 13 wherein said shiftable means are manually operable.

15. In a duplicating machine, in combination, a rotary printing roller and a counter roller cooperating with said printing roller, one of said rollers being movable to and from a printing position in close proximity with the other roller; operating means for moving said one roller to and from said printing position and including an electromagnetic means for actuating the same; feeding means for feeding copy sheets to said rollers; sheet means detachably mounted on the peripheral face of said printing roller and including a set of printing sections, and a set of control sections respectively associated and correlated with said printing sections and carrying control marks in preselected control sections thereof; sensing means for sensing control marks on said sheet means; and circuit means connecting said sensing means with said electromagnetic means and including rotary contact means attached to said printing roller for rotation therewith, and stationary contact means cooperating with said rotary contact means for rendering said sensing means operative when said sensing means are in operative position opposite said control marks, so that said operating means are actuated to move said one roller to said printing position when said sensing means sense a control mark whereby selected printing sections associated with said preselected control sections in which control marks are sensed are printed on the copy sheets.

References Cited in the file of this patent

UNITED STATES PATENTS

| | | |
|---|---|---|
| 2,101,435 | Lang | Dec. 7, 1937 |
| 2,543,435 | Buckley | Feb. 27, 1951 |
| 2,605,879 | O'Halloran | Aug. 5, 1952 |
| 2,724,330 | Brown et al. | Nov. 22, 1955 |
| 2,787,121 | Delplanque | Apr. 2, 1957 |